May 14, 1935. E. PRINCIOTTA 2,001,352
COOKING UTENSIL
Filed April 21, 1934  2 Sheets-Sheet 1
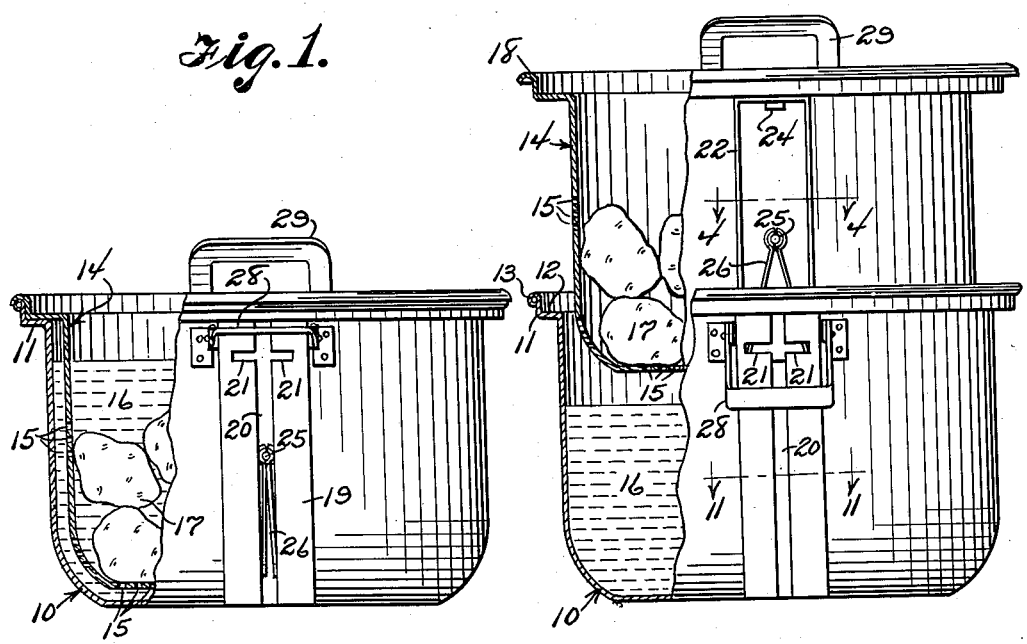
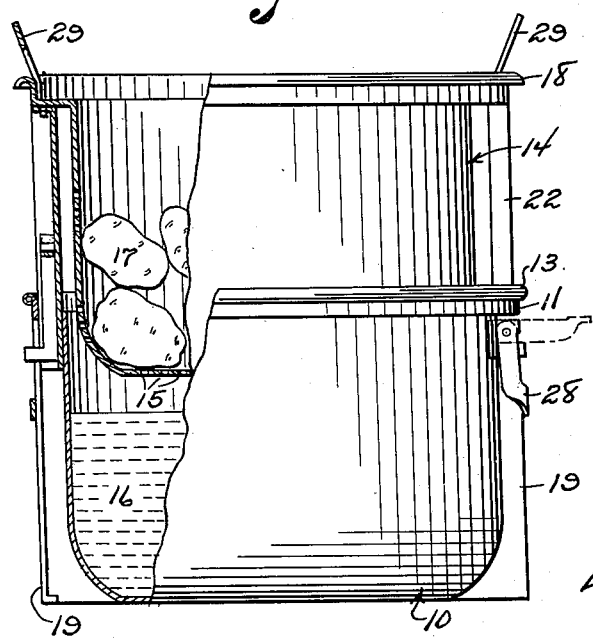
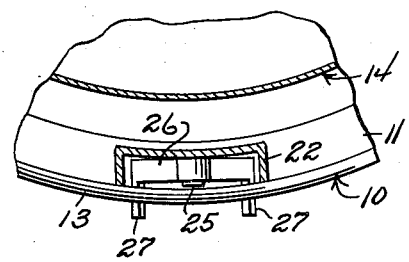
Emanuel Princiotta
INVENTOR
BY Victor J. Evans & Co.
ATTORNEY May 14, 1935.  E. PRINCIOTTA  2,001,352
COOKING UTENSIL
Filed April 21, 1934   2 Sheets-Sheet 2
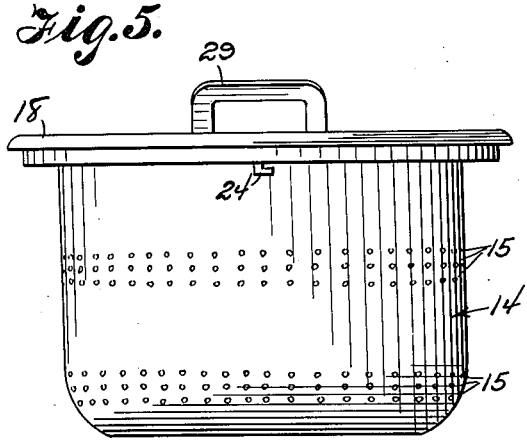
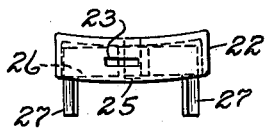
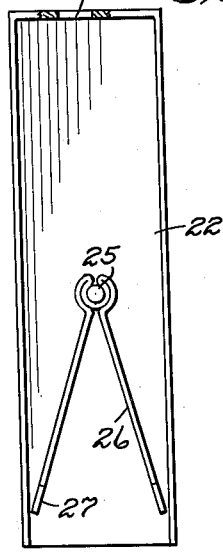
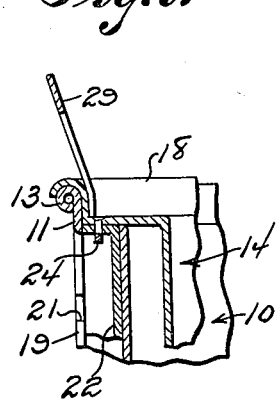
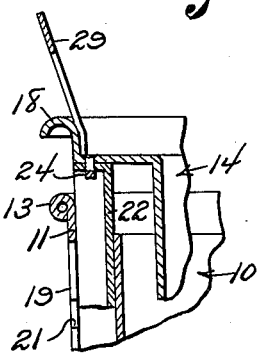
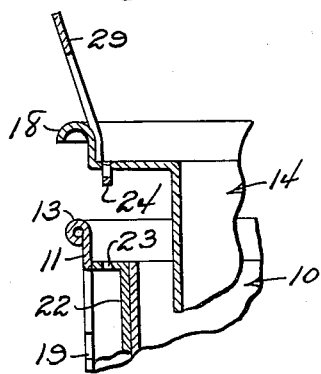
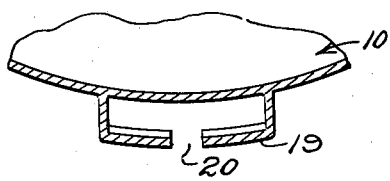
Emanuel Princiotta
INVENTOR
BY Victor J. Evans & Co.
ATTORNEY Patented May 14, 1935

2,001,352

UNITED STATES PATENT OFFICE 2,001,352

COOKING UTENSIL

Emanuel Princiotta, Grosse Pointe, Mich.

Application April 21, 1934, Serial No. 721,784

2 Claims. (Cl. 53—2)

The invention relates to a cooking utensil and more especially to a combined boiler and strainer.

The primary object of the invention is the provision of a utensil of this character, wherein a strainer is arranged therein so that foodstuff as within the utensil may be lifted by the strainer to permit the draining of such foodstuff and the strainer when lifted can be latched in its raised position, thereby avoiding the necessity of holding the strainer by hand for draining purposes.

Another object of the invention is the provision of a utensil of this character, wherein the strainer can be removed therefrom with dispatch, thus permitting thorough cleaning of the utensil, as well as the strainer, the means for the latching of the strainer in a raised position being novel in construction and assembly.

A further object of the invention is the provision of a utensil of this character which is simple in construction, thoroughly reliable and effective for use, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of a utensil constructed in accordance with the invention and the same being partly in section, with the strainer in its lowered position.

Figure 2 is a view similar to Figure 1 showing the strainer raised and latched.

Figure 3 is an elevation partly in section, the section being taken longitudinally through the latching means.

Figure 4 is a fragmentary sectional view on the line 4—4 of Figure 2 looking in the direction of the arrows.

Figure 5 is an elevation of the strainer removed from the utensil.

Figure 6 is a detail top plan view of one part of the latching means.

Figure 7 is a side elevation thereof.

Figure 8 is a fragmentary vertical sectional view showing one part of the latching medium joined with the strainer.

Figure 9 is a view similar to Figure 8 showing an adjustment of the parts.

Figure 10 is a view similar to Figure 9 showing the strainer released from one part of said means.

Figure 11 is a sectional view on the line 11—11 of Figure 2 looking in the direction of the arrows.

Similar reference characters indicate corresponding parts throughout the several views in the drawings.

Referring to the drawings in detail, the cooking utensil, which is in the form of a combined boiler and strainer, comprises the outer receptacle 10 having at its upper open top the mouth rim 11 forming a seat 12 entirely about the open top of said receptacle, the free edge of the rim 11 being outwardly curled to provide a marginal bead 13 for increasing the strength of the rim and eliminating sharp edges thereto. Fitted within the receptacle 10 is an inner receptacle 14 constituting a strainer, the bottom and side walls of this inner receptacle being formed with strainer openings or holes 15. Adapted to be placed within the inner receptacle 14 is the foodstuff to be cooked, while within the outer receptacle 10 is the liquid, as for example, water 16, for boiling purposes. For the purpose of illustration, the inner receptacle 14 has therein potatoes, indicated at 17, to be boiled within the utensil. After the cooking of the potatoes 17, the inner receptacle 14 can be lifted for the draining of the water 16 out of the inner receptacle 14 and from the potatoes 17 into the outer receptacle 10, as should be clearly apparent.

The inner receptacle 14 has at its open top the mouth flange or rim 18 which is adapted to engage with the rim 11 when the said inner receptacle is lowered into the outer receptacle 10 and in this manner the inner receptacle 14 will be suspended within the outer receptacle, as is clearly shown in Figure 1 of the drawings, so that the foodstuff within the inner receptacle is out of contact with the outer receptacle throughout the cooking period.

The outer receptacle has formed therewith, externally of the same, vertical guide housings 19, each formed with the central longitudinal slot 20 and the lateral slots 21, respectively, these opening into the slot 20 and being located near the top or upper end of the housing. Fitted within each housing 19 is a slidable leg 22 having in its top the slot 23, while on the rim 18 of the inner receptacle 14 is the L-shaped keeper 24 to be received in the slot 23 and by a slight turn of the inner receptacle 14, each leg 22 will be detachably latched therewith, so that on the lifting of the inner receptacle 14 the legs 22 will move therewith and in this movement slide within the housings 19, as should be apparent.

In each leg 22 is secured, as at 25, a double spring arm latch 26, the arms of the latter being formed with the latching terminals or nibs 27, these being adapted to spring into the lateral slots 21 for the latching of the legs 22 when raised and extended from the housings 19 and in this manner the inner receptacle 14 will be held in its raised position for the draining of the contents thereof. The raised position of the inner receptacle 14 is clearly shown in Figures 2 and 3 of the drawings. It will be apparent that by releasing the keepers 24 from the slots 23 and the legs 22 the inner receptacle 14 can be entirely separated from these legs and thus removed from the outer receptacle 10.

The outer receptacle has arranged at opposite sides thereof the swinging handles 28, while the inner receptacle 14 has the stationary upstanding handles 29 for convenience in the handling of both receptacles.

Normally the inner receptacle 14 is lowered into the outer receptacle 10 with its rim 18 resting on the rim 11 of the outer receptacle, it being understood, of course, that the latches 26 are manually actuated for their disengagement from the slots 21, so that the legs 22 will be free to move downwardly into the housings 19, the nibs 27 following the slots 20 in the said housings in the lowering movement of the legs within the latter. When the inner receptacle 14 is lifted, the nibs 27 of the latches 26 will ride upwardly in the slots 20 and then be sprung into the slots 21 so that the legs 22 will be latched in raised position and in supporting relation to the inner receptacle 14, whereby it will be held raised for the draining of the foodstuff as contained therein.

It should be obvious that when the inner receptacle 14 is freed from the legs 22 it may be separated from the outer receptacle 10 and thus permitting the cleaning of both receptacles for sanitary purposes.

What is claimed is:

1. A cooking utensil of the kind described comprising inner and outer containers movable relative to each other and open at their tops, a mouth rim formed on the outer container and providing a seat for the open top of the inner container, said inner container having perforated sides and bottom, vertical guide housings formed on the outer container and having longitudinal and lateral slots intersecting each other, legs on the inner container and slidably fitting the housings, and a double spring arm latch arranged in each of the legs and having latching nibs working in the longitudinal slot and receivable in the lateral slot for the latching of the containers in determined positions with respect to each other.

2. A cooking utensil of the kind described comprising inner and outer containers movable relative to each other and open at their tops, a mouth rim formed on the outer container and providing a seat for the open top of the inner container, said inner container having perforated sides and bottom, vertical guide housings formed on the outer container and having longitudinal and lateral slots intersecting each other, legs on the inner container and slidably fitting the housings, a double spring arm latch arranged in each of the legs and having latching nibs working in the longitudinal slots and receivable in the lateral slot for the latching of the containers in determined positions with respect to each other, and keepers carried by the inner container and engageable at the top of the housings therewith for the fastening of the containers when one is lowered within the other.

EMANUEL PRINCIOTTA.